United States Patent [19]

Kämpf

[11] Patent Number: 5,342,241
[45] Date of Patent: Aug. 30, 1994

[54] TORQUE LIMITING COUPLING WITH DRIVING MEMBERS AND SWITCHING CAMS HAVING COMPLEMENTARY FACES

[75] Inventor: Klaus Kämpf, Lohmar, Fed. Rep. of Germany

[73] Assignee: Jean Walterscheid GmbH, Lohmar, Fed. Rep. of Germany

[21] Appl. No.: 975,601

[22] Filed: Nov. 12, 1992

[30] Foreign Application Priority Data

Nov. 16, 1991 [DE] Fed. Rep. of Germany ....... 4137829

[51] Int. Cl.$^5$ .................................. F16D 7/04
[52] U.S. Cl. ......................................... 464/37
[58] Field of Search .................. 464/37, 38, 30, 64

[56] References Cited

U.S. PATENT DOCUMENTS

| | | |
|---|---|---|
| 2,238,583 | 4/1941 | Dodge . |
| 2,429,091 | 10/1947 | Dodge et al. . |
| 4,417,650 | 11/1983 | Geisthoff ..................... 464/37 X |
| 4,468,206 | 8/1984 | Herchenbach et al. .......... 464/37 |
| 4,802,326 | 2/1989 | Geisthoff ..................... 464/37 X |
| 4,896,755 | 1/1990 | Girguis ....................... 464/38 X |
| 4,919,244 | 4/1990 | Bondioli ..................... 464/39 |

FOREIGN PATENT DOCUMENTS

| | | |
|---|---|---|
| 912411 | 5/1954 | Fed. Rep. of Germany . |
| 3001566 | 7/1981 | Fed. Rep. of Germany . |
| 3205513 | 3/1983 | Fed. Rep. of Germany . |
| 9206232 | 8/1992 | Fed. Rep. of Germany . |
| 2615256 | 11/1988 | France . |
| 849516 | 9/1960 | United Kingdom ............ 464/38 |
| 2082695 | 3/1982 | United Kingdom . |

Primary Examiner—Daniel P. Stodola
Assistant Examiner—Eileen A. Dunn
Attorney, Agent, or Firm—Harness, Dickey & Pierce

[57] ABSTRACT

A torque limiting coupling (5) has a plurality of slide-like driving members (19) circumferentially and movably distributed in a coupling hub (10). The unit is rotatably accommodated in a coupling sleeve (7). The driving members (19), with their torque transmitting faces (25) at their heads, are pushed by a spring assembly (38, 39) and switching cams (32) into correspondingly designed recesses (22) of the coupling sleeve (7). The pressure springs (38, 39) and the switching faces (30, 31) of the driving members (19) as well as the torque transmitting face (25) are arranged so as to extend in the same direction. Thus, the springs (38, 39), during the transmission of torque by the coupling sleeve (7), subject the driving members (19) to a moment which acts against the tilting moment resulting from the transmission of torque. This results in an improved wear and switching behavior.

9 Claims, 3 Drawing Sheets

TORQUE LIMITING COUPLING WITH DRIVING MEMBERS AND SWITCHING CAMS HAVING COMPLEMENTARY FACES

BACKGROUND OF THE INVENTION

The invention relates to a torque limiting coupling, especially in a driveline, for driving agricultural implements or machinery. The coupling includes a coupling hub and a rotatably supported coupling sleeve. Driving members are movably arranged in inwardly directed, circumferentially distributed recesses of the coupling hub. The heads of the driving members, in the torque transmitting position, each engage a corresponding recess in the opposed inner face of the coupling sleeve. The heads, in the switched-off position, are disengaged from the recesses. The rotational axis of the coupling sleeve and coupling hub extends parallel to the torque transmitting face of the heads. The base of the driving elements is provided with two switching faces. One switching face provides support in the torque transmitting position, and the other switching face, provides support in the switched-off position. The switching faces are loaded by respective switching faces of a switching cam. The switching cam is spring-loaded in the direction of the torque transmitting position and movable transversely relative to the respective driving member arranged in the recess in the coupling hub. The switching faces serve torque transmitting purposes and extend at an angle relative to the central axis of the respective driving member. The angle is greater than the angle of the switched off position. Also, the switching faces are designed so as to correspond to one another.

DE-PS 912 411, published Apr. 15, 1954, illustrates a torque limiting coupling. The torque limiting coupling is designed to transmit torque and to be switched off in both possible directions of rotation. For this purpose, the head faces of the driving members are designed as cylindrical members. Each member includes two inclined faces engaging coupling sleeve recesses with corresponding inclined faces. Towards the inside, the driving members are provided with inclined faces loaded by switching cams, which are movable transversely relative to the driving members. The switching cams are each loaded towards one another in the direction of the switching faces of the driving members by a spring. In the disconnected position, the switching cams, with their faces extending parallel to the cylindrical face, are supported on the cylindrical face of the driving members. Re-engagement is possible through actuation from the outside. For this purpose, there is provided a switching ring which, via a slot control system, engages the driving members and moves them back into the torque transmitting position. With such a design, the driving members, when torque is transmitted, carry out a tilting movement around all axis extending through the central axis of the driving members and parallel to the rotational axis of the torque limiting coupling. As the spring forces exerted by the switching cams cancel one another, these cannot make a stabilizing contribution.

The tilting movement leads to edge pressure between the recess edges loaded by the respective driving members in the torque transmitting direction towards the outer face of the coupling hub. This leads to an increase in the size of the recess through wear and to wear on the driving members.

In addition, there is built up a projection which increases the friction between the outer face of the coupling hub and the inner face of the coupling sleeve. The overall result is that the reaction accuracy is reduced and furthermore, increasing wear may lead to overloading.

SUMMARY OF THE INVENTION

It is an object of the invention to provide a torque limiting coupling which substantially avoids any tilting moment acting on the driving members during the transmission of torque. In accordance with the invention, the objective is achieved by arranging the torque transmitting face and the switching faces of the driving members so as to circumferentially extend in the same direction.

The advantage of this design is that the force of the spring assemblies loading the switching cams and driving members act against the tilting tendency of the driving members resulting from the torque transmission. This also, in the long run, improves the switching behavior of the torque limiting coupling.

To put the invention into effect, it is proposed further that the torque transmitting face and the switching face should be directed towards the spring assemblies loading the switching cams. In this case, the springs are designed as pressure springs.

A particularly advantageous embodiment is obtained by providing driving members with a rectangular cross-section. This results in large contact faces which lead to improved torque support as compared to the cylindrical driving members according to the state of the art.

In a preferred embodiment, one switching cam is provided. The length of the cam approximately corresponds to that of the respective driving member. Also, a plurality of springs are arranged side by side for loading the switching cam.

A particularly advantageous type of support is achieved if the switching faces of the driving members serving to support the driving members in the torque transmitting position extend at an angle of about 45° to about 70°, especially 60°, relative to the central axis of the driving members. If the driving members have a rectangular cross-section, the central axis constitutes the central plane of the driving members. As far as the switching faces serving to support the driving members in the switched-off position are concerned, it is preferably proposed that they extend at an angle of about 14° to about 20°, especially 17°, relative to the central axis of the driving members.

An important aspect of a torque limiting coupling is its behavior when it is reconnected after having been disengaged due to an overload. With embodiments in accordance with the state of the art, such automatic reconnection can only be achieved through intervention from the outside. However, the above-described way of arranging the switching faces for supporting the driving members in the switched-off position permits automatic reconnection of the coupling under the force of the springs. In order to improve this reconnection behavior, the invention proposes that the central axis of the driving members should be offset relative to a plane extending parallel thereto and containing the rotational axis so that the plane is arranged between the central axis and the torque transmitting face.

With this type of arrangement, the distance to be covered by the driving members to reach the torque transmitting position is extended so that at low speeds, a transfer into the recesses takes place. This behavior may alternatively or in addition to this solution be achieved by providing a chamfer between the supporting face, cooperating with the torque transmitting face of the driving members, and the inner face of the coupling sleeve.

The behavior may also be improved by providing a chamfer on the head face of the driving members at the end facing away from the supporting face.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein:

FIG. 2a is an enlarged view of FIG. 2 within circle 2a.

DETAILED DESCRIPTION OF THE PREFERRED EMBODIMENTS

Figure 1:
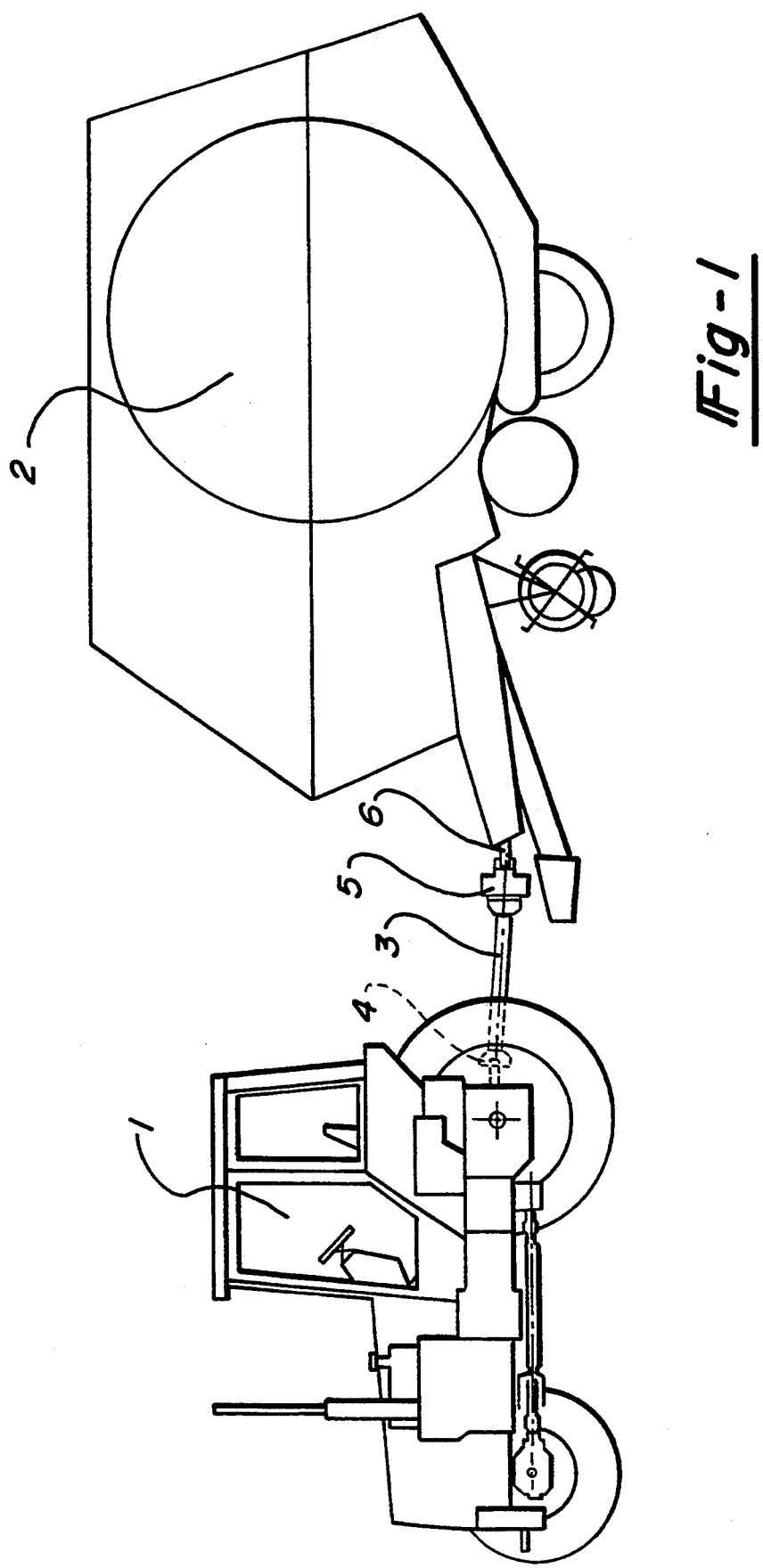
FIG. 1 is a schematic plan view of a drive assembly including a tractor and a driven implement.

FIG. 1 shows a tractor 1 attached to an implement 2. The implement 2 is driven by the power take-off shaft 4, via a driveshaft 3. The driveline further includes a torque limiting coupling 5 slipped onto a driving journal 6 of the implement 2.

Figure 2:
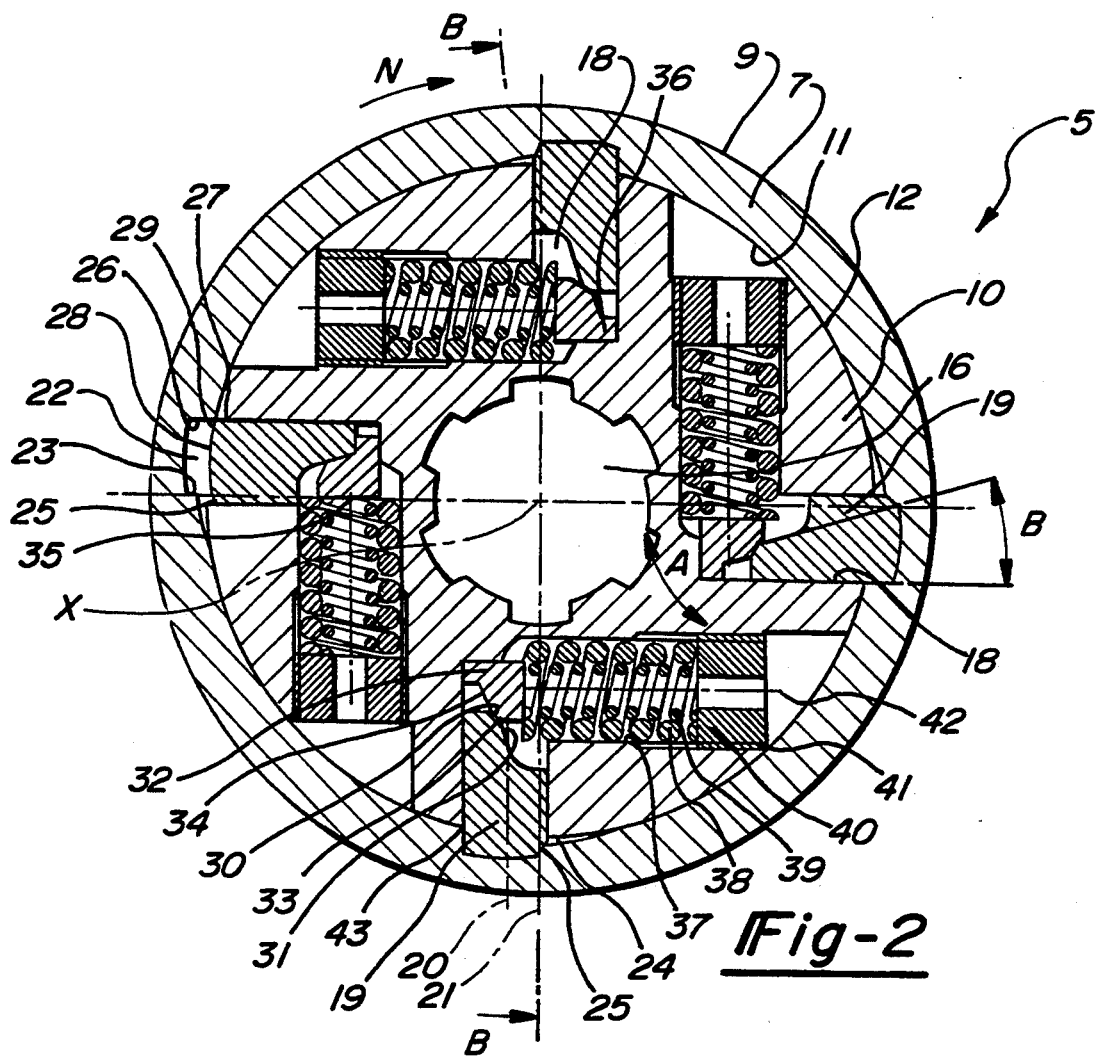
FIG. 2 is a cross-section view of FIG. 3 through line 2—2 thereof.
Figure 2A:
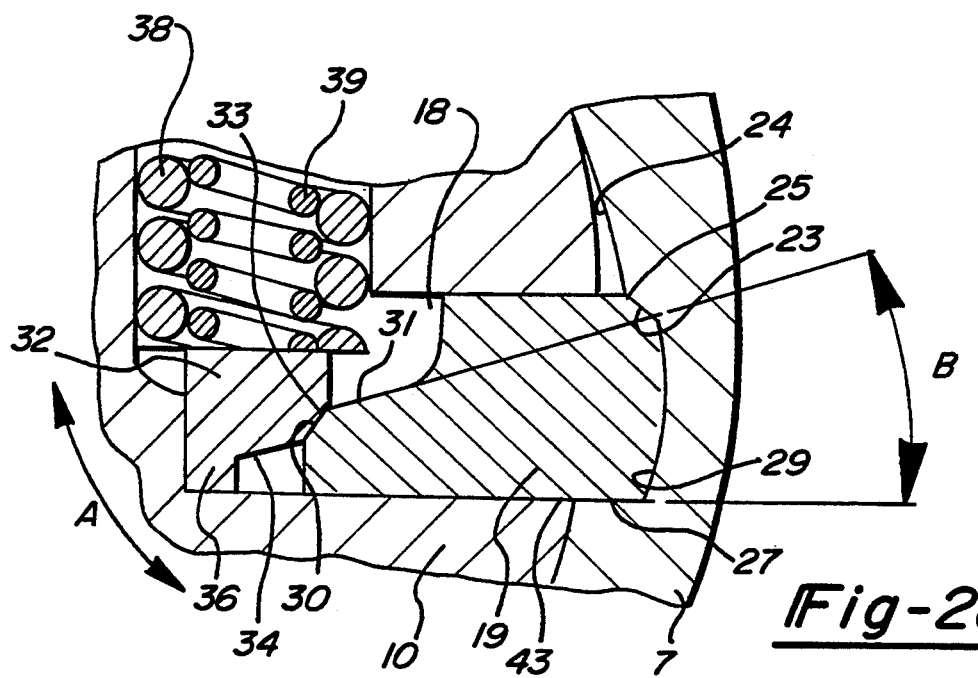
Figure 3:
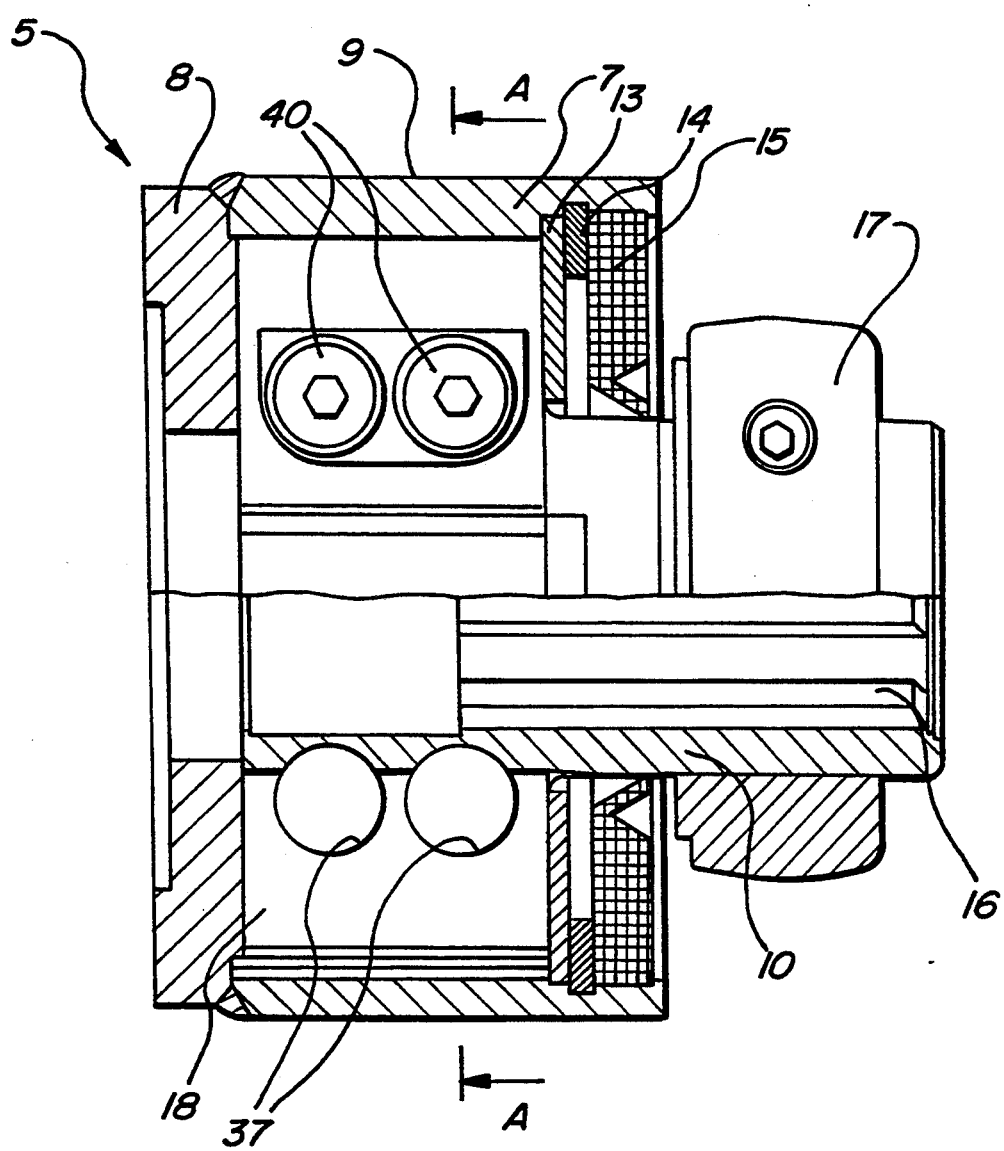
FIG. 3 is a longitudinal section view of FIG. 2 through line 3—3 thereof.

Turn to FIGS. 2 and 3 for a better understanding of the torque limiting coupling 5. The torque limiting coupling 5 includes a coupling sleeve 7 with a flange 8 and a substantially cylindrical housing casing 9. The flange 8 and housing casing 9 are non-rotatingly connected to one another for instance by welding. The flange 8 serves, for example, to connect to the driveshaft 3 driving the implement 2 according to FIG. 1 and constituting the driving coupling part.

The coupling hub 10, with its outer face 12, is rotatably accommodated in a bore 11 of the coupling sleeve 7. The coupling hub 10 is axially secured in the coupling sleeve 7 by abutting the inner face of the flange 8 and by means of a stop disc 13 inserted into the housing casing 9 and secured via a securing ring 14. The coupling sleeve 7 is sealed relative to the coupling hub 10 by a seal 15. The coupling hub 10 is provided with a slip-on bore 16 having a multi-spline profile. Furthermore, the coupling hub 10 axially extends from the coupling sleeve 7. The projecting end of the hub 10 includes a lock 17 which secures the torque limiting coupling 5 to the driving journal 6 of the implement 2, as seen in FIG. 1.

Starting from its outer face 12, the coupling hub 10 is provided with recesses 18. These recesses 18 may also be designed as slots extending parallel to the rotational axis X of the torque limiting coupling 5. The central axis or central plane of the recesses 18 has been given the reference number 20 and is offset in parallel to a plane 21 including the rotational axis X. The circumferentially distributed recesses 18 contain flat, radially movable slide-like driving members 19. In the embodiment shown, a total of four such driving members 19 are arranged around the circumference of the coupling hub 10. At their head portion facing the inner face 11 of the coupling sleeve 7, the driving members 19 include a torque transmitting face 25. The face 25 is positioned at the rear in the torque transmitting direction N of the coupling sleeve 7 and extends at an angle relative to the plane containing the central axis 20. The opposed face of the driving members 19 is its rear face 27.

In the torque transmitting position, the driving members 19, via these two faces, engage the recesses 22 in the inner face 11 of the coupling sleeve 7. The recesses 22 each include a supporting face 23 extending in the same direction as the torque transmitting face 25. The supporting face 23, via a chamfer 24, changes into the inner face 11 of the coupling sleeve 7. The side face 26 is arranged opposite the supporting face 23. The recess 22 serves to support the rear face 27 of the driving members 19 to prevent them from rotating backwards.

Starting from the head face 28 of the driving members 19, a further chamfer 29 is provided relative to the rear face 27. The two chamfers 24, 29 and also the offset position of the driving members 19 away from the radial plane 21 lead to a delayed engagement of the driving members 19 and a delayed transfer into the torque transmitting position. This delay, as shown in the drawing, is due to the fact that distance to be covered by the driving members 19, for the purpose of engaging the recesses 22, is extended as compared to an assembly in the case of which the central axis 20 coincides with the radial plane 21.

The driving members 19 are urged into the torque transmitting position by spring-loaded switching cams 32. It can be seen that the adjusting axis 42 of the switching cams 32 extends approximately at a right angle relative to the central axis 20 of the driving members 19. Each switching cam 32 is designed as a kind of strip and includes a contact face 35 supporting one end of pressure springs 38, 39 arranged one inside the other. The pressure springs 38, 39 are accommodated in an aperture 37 of the coupling hub 10. The other end of the springs is supported on one of the end faces of a locking screw 40 threaded into a threaded bore 41 of the coupling hub 10.

Both the torque transmitting faces 25 of the driving members 19 and their switching faces 30, 31, arranged in the base region, are aligned so as to point towards the spring assembly. The switching face 30 of the driving members 19 serves to support the respective driving member 19 in the torque transmitting position. In the torque transmitting position, the torque transmitting face 25 contacts the supporting face 23 of the recess 22 in the coupling sleeve 7. In this position, the driving members 19 radially extend beyond the outer face 12 of the coupling hub 10. The switching face 30 for providing support in the torque transmitting position is inclined at the angle A relative to the central axis 20. This angle preferably amounts to 60°. The angle depends on the transmission ratio between the force applied by the springs 38, 39 and the inclination of the torque transmitting face 25 and the desired disconnecting torque. The switching face 30 is loaded by a corresponding configuration switching face 33 of the switching cam 32. It extends at the same angle of inclination as the switching face 30.

When the predetermined torque is exceeded, the driving members 19 escape radially inwardly and at the same time, the switching cams 32 are displaced against the force of the springs 38, 39. Displacement continues until the switching faces 31 of the driving members 19 providing support in the switched-off position come to rest against the respective counter faces associated in the form of switching faces 34 with the switching cam 32. With reference to the central axis 20, the switching faces 31 and 34 extend at an angle which has been given the reference symbol B and is approximately 14° to 20°. Preferably, the angle B is about 17°. The angle is decisive for reconnection. Thus, the angle ensures that under the force of the springs 38, 39, the driving members 19 are transferred into the engaged position relative to the recesses 22. This means that the angle B must be greater than the friction angle. In the radially inner position, i.e. in the switched-off position, the driving members 19 are prevented from moving inwardly any further by the projection 36 at the switching cams 32.

In FIG. 3 it can be seen that each driving member 19 is loaded by two spring assemblies arranged side by side. The lower half of FIG. 3 shows the two apertures 37 arranged side by side which serve to receive the springs 38, 39. To support the torque when the coupling sleeve 7 is driven in the driving direction of rotation N, via the torque transmitting face 25, a tilting moment is introduced around the edge 43 at the transition between the outer face 12 of the coupling hub and the associated recess 18.

With this type of arrangement, the force of the pressure springs 38, 39 acts against this tilting movement, via the switching cams 32, so that the introduction of force is improved. The introduction of force is further improved by the large area of the rear face 27. As a result of the counter moment applied by the pressure springs 38, 39 and the switching cams 32 to the driving members 19, the edge 43 is subjected to low loads, substantially preventing deformation.

I claim:

1. A torque limiting coupling for driving agricultural implements or machinery comprising:

a coupling hub and a coupling sleeve relatively rotatably supported thereon;

driving members movably arranged in inwardly directed, circumferentially distributed recesses of said coupling hub, said driving members including heads which, in the torque transmitting position, each engage a corresponding recess in the opposed inner face of the coupling sleeve and in a switched-off position, disengage therefrom, the torque transmitting face of the heads extending parallel to a rotational axis of the coupling sleeve and coupling hub, a base of the driving members being provided with two switching faces one switching face providing support in the torque transmitting position, and the other switching face providing support in the switched-off position;

a switching cam including at least first and second adjacent switching faces loading said driving members, said cam being spring-loaded in the direction of the torque transmitting position and movable transversely relative to the respective driving member arranged in the recesses in the coupling hub, one of the switching faces of the cam and driving members, which serve torque transmitting purposes, extending at an angle relative to the central axis of the respective driving member, said angle being greater than the angle of the second switching face for the switched-off position, and the switching faces being designed so as to correspond to one another, and said torque transmitting face and the switching faces of the driving members being arranged so as to circumferentially extend in the same direction.

2. The torque transmitting coupling according to claim 1, wherein the torque transmitting faces and the switching faces of the driving element are directed towards spring assemblies loading the switching cams.

3. The torque limiting coupling according to claim 1, wherein the driving members have a rectangular cross-section.

4. The torque limiting coupling according to claim 1, wherein one switching cam with a plurality of springs arranged coaxially and loading said switching cam is provided per driving member.

5. The torque limiting coupling according to claim 1, wherein the first switching face of the driving members serve to support the driving members in the torque transmitting position extend at the angle of about 45° to about 70°, relative to the central axis of the driving members.

6. A torque limiting coupling according to claim 1, wherein the second switching face of the driving members serving to support the driving members in the switched off position extend at an angle of about 14° to about 20°, relative to a central axis of the driving members.

7. A torque limiting coupling according to claim 1, wherein the central axis of the driving members is offset relative to a plane extending parallel thereto and contact the rotational axis so that the plane is arranged between the central axis and the torque transmitting face.

8. The torque limiting coupling according to claim 1, wherein a chamfer is provided between a supporting face, on said coupling sleeve, cooperating with the torque transmitting face of the driving members and the inner face of the coupling sleeve.

9. The torque limiting coupling according to claim 1, wherein a chamfer is adjacent a head face of the driving members at the end facing away from a supporting face on said coupling sleeve.

* * * * *